(12) United States Patent
Ogiwara (10) Patent No.: US 11,849,243 B2
(45) Date of Patent: Dec. 19, 2023

(54) VIDEO CONTROL APPARATUS AND VIDEO CONTROL METHOD

(71) Applicant: NEC Display Solutions, Ltd., Tokyo (JP)

(72) Inventor: Yusuke Ogiwara, Tokyo (JP)

(73) Assignee: SHARP NEC DISPLAY SOLUTIONS, LTD., Tokyo (JP)

( * ) Notice: Subject to any disclaimer, the term of this patent is extended or adjusted under 35 U.S.C. 154(b) by 818 days.

(21) Appl. No.: 16/964,383

(22) PCT Filed: Mar. 13, 2018

(86) PCT No.: PCT/JP2018/009758
§ 371 (c)(1),
(2) Date: Jul. 23, 2020

(87) PCT Pub. No.: WO2019/175971
PCT Pub. Date: Sep. 19, 2019

(65) Prior Publication Data
US 2020/0351453 A1 Nov. 5, 2020

(51) Int. Cl.
*H04N 5/272* (2006.01)
*H04N 5/45* (2011.01)
*H04N 5/445* (2011.01)

(52) U.S. Cl.
CPC ......... *H04N 5/272* (2013.01); *H04N 5/44504* (2013.01); *H04N 5/45* (2013.01)

(58) Field of Classification Search
CPC ....... H04N 5/272; H04N 5/44504; H04N 5/45
USPC ....................................................... 386/241
See application file for complete search history.

(56) References Cited

U.S. PATENT DOCUMENTS 7,196,677 B2 * 3/2007 Sato ........................ G09F 9/302
345/1.3
7,237,197 B2 * 6/2007 Camara .............. H04N 21/4223
715/838
7,893,999 B2 * 2/2011 Bennett ............ H04N 21/47205
386/248

(Continued)

FOREIGN PATENT DOCUMENTS

CN 103049755 A 4/2013
CN 104951263 A 9/2015

(Continued)

OTHER PUBLICATIONS

International Search Report (ISR) (PCT Form PCT/ISA210), in PCT/JP2018/009758, dated Jun. 5, 2018.

(Continued)

*Primary Examiner* — Helen Shibru
(74) *Attorney, Agent, or Firm* — MCGINN I.P. LAW GROUP, PLLC (57) ABSTRACT

A video control apparatus includes a display that displays a video, a capturer that captures a video of a display screen of the display, an area determiner that determines whether or not a second area that displays a video of a display screen that has been previously captured is included in a first area that is an area of a capturing target of the video, and a video generator that generates a video in which the video of the second area is not displayed from a video that has been captured from the first area and displays the generated video on the display if the second area is included in the first area.

10 Claims, 8 Drawing Sheets

(56) References Cited

U.S. PATENT DOCUMENTS

| | | | |
|---|---|---|---|
| 8,736,708 B2* | 5/2014 | Nagoya | H04N 23/88 |
| | | | 348/333.02 |
| 9,501,139 B2* | 11/2016 | Kim | H04N 23/631 |
| 9,818,377 B2* | 11/2017 | Ishikawa | H04N 9/3194 |
| 9,977,589 B2* | 5/2018 | Min | G06F 3/0481 |
| 10,015,308 B2* | 7/2018 | Cho | H04N 23/632 |
| 10,080,004 B2* | 9/2018 | Grundhofer | G01B 11/2504 |
| 10,489,015 B2* | 11/2019 | Yoon | G06F 3/0482 |
| 10,606,473 B2* | 3/2020 | Ogiwara | G06F 3/04883 |
| 10,631,632 B2* | 4/2020 | Epstein | A47B 21/06 |
| 2002/0083463 A1 | 6/2002 | Camara | |
| 2010/0150450 A1 | 6/2010 | Tsuji | |
| 2010/0208033 A1 | 8/2010 | Edge et al. | |
| 2010/0259645 A1* | 10/2010 | Kaplan | H04N 5/772 |
| | | | 348/E5.031 |
| 2011/0050927 A1 | 3/2011 | Nagoya | |
| 2015/0288795 A1* | 10/2015 | Park | G06F 3/04842 |
| | | | 455/566 |
| 2017/0171492 A1 | 6/2017 | Naito | |

FOREIGN PATENT DOCUMENTS

| | | |
|---|---|---|
| CN | 105323473 A | 2/2016 |
| CN | 106155517 A | 11/2016 |
| JP | 3283506 B | 5/2002 |
| JP | 2009-042162 A | 2/2009 |
| JP | 2010-028273 A | 2/2010 |
| JP | 2014-090364 A | 5/2014 |

OTHER PUBLICATIONS

Chinese Office Action, dated May 11, 2022, in Chinese Application No. 201880088912.5 and English Translation thereof.

* cited by examiner

VIDEO CONTROL APPARATUS AND VIDEO CONTROL METHOD

TECHNICAL FIELD

The present invention relates to a video control apparatus and a video control method.

BACKGROUND ART

There is a technique of connecting to a device that receives images, such as a liquid crystal display or a projector, through a network, such as a wireless local area network (LAN), and transmitting videos and/or images thereto. For example, Patent Documents 1 and 2 disclose a technique of transmitting and receiving videos to and from another device through a network and sharing the videos with the other device. A device such as a personal computer (PC) can project, for example, a screen and/or images of the PC on a projector or the like by connecting to a receiving device, and thus the screen and/or images can be shared with many people. Moreover, a PC can also capture videos of a display unit of the apparatus itself and display the videos similarly to videos from another apparatus.

PRIOR ART DOCUMENTS

Patent Documents

Patent Document 1: Japanese Patent No. 3283506
Patent Document 2: Japanese Unexamined Patent Application, First Publication No. 2014-090364

SUMMARY OF THE INVENTION

Problems to be Solved by the Invention

However, when videos of the display unit of the apparatus itself are captured and displayed, if an area that displays a video of the apparatus itself that has been previously captured is present within an area to be captured, a loop of displayed videos arises and a nested state like an infinity mirror occurs.

For example, when the screen of the $n+1^{th}$ frame is displayed on a main screen, a captured video of the display screen of the previous $n^{th}$ frame of the apparatus itself is displayed. Here, when the screen of the $n+1^{th}$ frame is captured, information of the screen of the $n^{th}$ frame and information of the screen of the $n+1^{th}$ frame are included in the captured image. When the screen of the $n+2^{th}$ frame is displayed on the main screen, a captured video of the display screen of the previous $n+1^{th}$ frame of the apparatus itself is displayed. Here, when the screen of the $n+2^{th}$ frame is captured, the information of the screen of the $n^{th}$ frame, the information of the screen of the $n+1^{th}$ frame, and information of the screen of the $n+2^{th}$ frame are included in the captured image. Similarly, when the screen of the $n+3^{th}$ frame is captured, the information of the screen of the $n^{th}$ frame, the information of the screen of the $n+1^{th}$ frame, the information of the screen of the $n+2^{th}$ frame, and information of the screen of the $n+3^{th}$ frame are included in the captured image. When the screen of the $n+4^{th}$ frame is captured, the information of the screen of the $n^{th}$ frame, the information of the screen of the $n+1^{th}$ frame, the information of the screen of the $n+2^{th}$ frame, the information of the screen of the $n+3^{th}$ frame, and information of the screen of the $n+4^{th}$ frame are included in the captured image. In this manner, a loop of displayed videos arises and a nested state like an infinity mirror occurs, and thus the influence by the screens of the past frames is continuously included in the captured videos.

In this manner, a phenomenon in which a loop of videos arises and videos like those in an infinity mirror are obtained is called the Droste effect. In general, when videos are transmitted, a technique of transmitting only the differences between the videos is frequently used in order to reduce the amount of communication data. However, there is a problem in that when a loop of displayed videos arises, the captured videos of the screen of the apparatus itself continuously change until convergence, and consequently the loads on a network and a central processing unit (CPU) are increased.

In view of the above problems, an example object of the present invention is to provide a video control apparatus and a video control method that are capable of preventing a loop of videos arising when the captured images of the screen of the apparatus itself are displayed.

Means for Solving the Problems

In order to solve the above-described problems, a video control apparatus in accordance with an example aspect of the present invention includes: a display unit that displays a video; a capturing unit that captures a video of a display screen of the display unit; an area determination unit that determines whether or not a second area that displays a video of a display screen that has been previously captured is included in a first area that is an area of a capturing target of the video; and a video generation unit that generates a video in which the video of the second area is not displayed from a video that has been captured from the first area and displays the generated video on the display unit if the second area is included in the first area.

A video control method in accordance with an example aspect of the present invention includes: a step of determining whether or not a second area that displays a video of a display screen that has been previously captured is included in a first area that is an area of a capturing target of a video when a video that is displayed on a display unit is captured; and a step of generating a video in which the video of the second area is not displayed from a video that has been captured from the first area and displaying the generated video on the display unit if the second area is included in the first area.

Example Advantages of the Invention

With the present invention, if the second area, which displays the video of the display screen that has been previously captured, is included in the first area, which is an area of a capturing target of a video, a video in which the video of the second area is not displayed is generated from the video captured from the first area and the generated video is displayed on the display unit, and thus it is possible to prevent a loop of videos arising and videos like those in an infinity mirror occurring.

MODES FOR CARRYING OUT THE INVENTION

Figure 1:
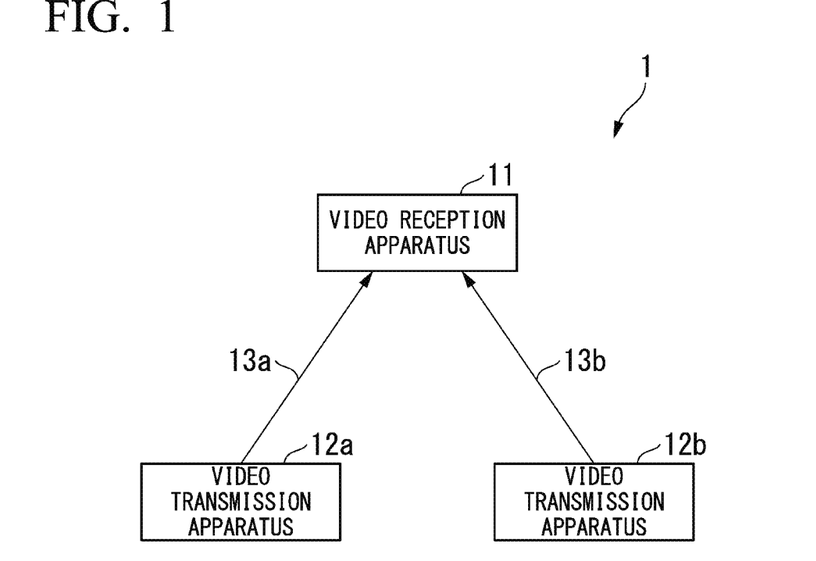
FIG. 1 is a block diagram showing the structure of a video display system in accordance with a first example embodiment of the present invention.

Hereinafter, example embodiments of the present invention will be described with reference to the drawings. FIG. 1 is a block diagram showing the structure of a video display system 1 in accordance with a first example embodiment of the present invention. As shown in FIG. 1, the video display system 1 in accordance with the first example embodiment of the present invention is configured to include a video reception apparatus 11 and video transmission apparatuses 12a and 12b. The video reception apparatus 11 is connected to the video transmission apparatuses 12a and 12b using video cables 13a and 13b of, for example, the High-Definition Multimedia Interface (HDMI) (registered trademark).

It is to be noted that although the two video transmission apparatuses 12a and 12b are connected to the video reception apparatus 11 here, this is an example, and the number of video transmission apparatuses connected to the video reception apparatus 11 is not limited to two. Moreover, although the video reception apparatus 11 is connected to the video transmission apparatuses 12a and 12b using the video cable 13a and 13b here, the video reception apparatus 11 may be connected to the video transmission apparatuses 12a and 12b wirelessly. Furthermore, the video reception apparatus 11 may be connected to the video transmission apparatuses 12a and 12b through a network.

The video reception apparatus 11 is provided with a display unit that is configured with a liquid crystal display or a projector and displays videos of the video reception apparatus 11 itself and videos from the other apparatuses (the video transmission apparatuses 12a and 12b). In the present example embodiment, the video reception apparatus 11 can synthesize captured videos captured from videos of the video transmission apparatuses 12a and 12b and a captured video captured from the display screen of the video reception apparatus 11 itself and display the synthesized video on the screen of the video reception apparatus 11 itself, which serves as a main screen. It is to be noted that a personal computer (PC) may be used as the video reception apparatus 11.

The video transmission apparatuses 12a and 12b transmit videos to the video reception apparatus 11. As the video transmission apparatuses 12a and 12b, any devices that can transmit videos to the outside, such as television receivers, hard disk drive (HDD) recorders, or digital versatile disc (DVD) players, may be used. Moreover, personal computers (PCs) may be used as the video transmission apparatuses 12a and 12b.

Figure 2:
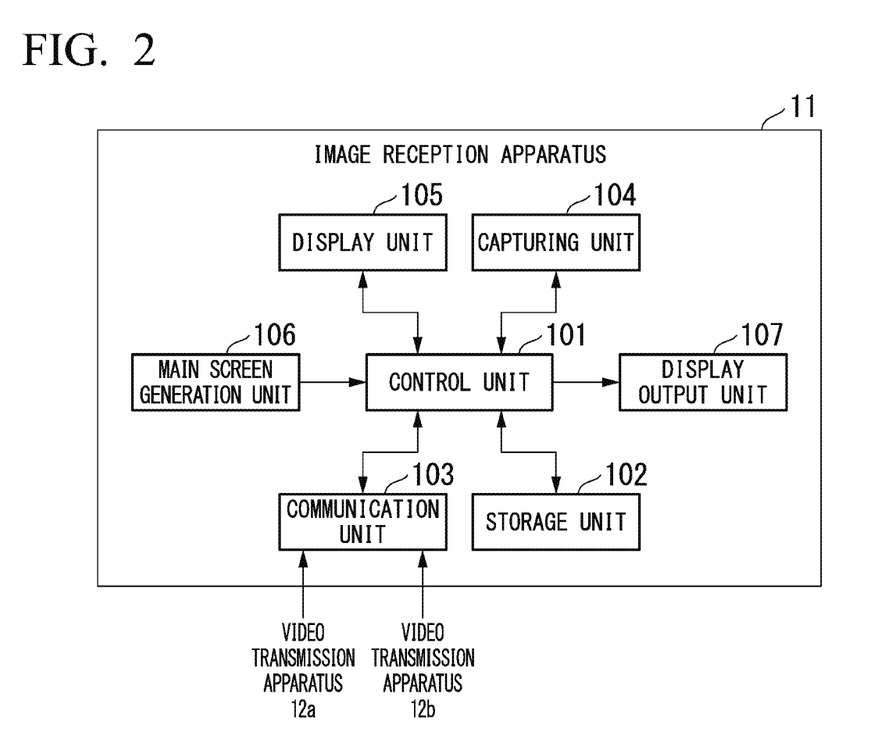
FIG. 2 is a block diagram showing a schematic structure of a video reception apparatus in accordance with the first example embodiment of the present invention.

FIG. 2 is a block diagram showing a schematic structure of the video reception apparatus 11 in accordance with the first example embodiment of the present invention. As shown in FIG. 2, the video reception apparatus 11 is configured to include a control unit 101, a storage unit 102, a communication unit 103, a capturing unit 104, a display unit 105, a main screen generation unit 106, and a display output unit 107.

The control unit 101 controls the entire video reception apparatus 11. In the present example embodiment, the control unit 101 performs a process of synthesizing a video of the main screen from the main screen generation unit 106, captured videos of the video transmission apparatuses 12a and 12b, and a captured video of the display screen of the video reception apparatus 11 itself.

Figure 3:
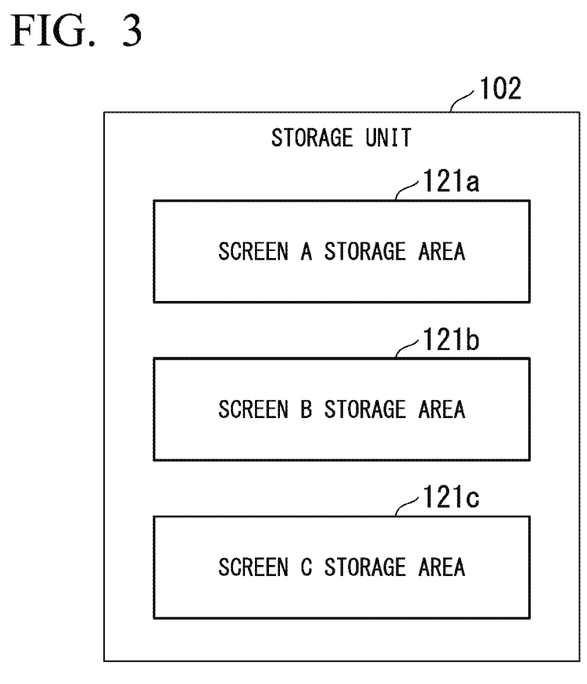
FIG. 3 is a diagram describing storage areas of a storage unit in the video reception apparatus in accordance with the first example embodiment of the present invention.

The storage unit 102 reads and writes various kinds of data. FIG. 3 is a diagram describing storage areas of the storage unit 102 in the video reception apparatus in accordance with the first example embodiment of the present invention. As shown in FIG. 3, in the present example embodiment, the storage unit 102 is provided with a screen A storage area 121a, a screen B storage area 121b, and a screen C storage area 121c.

The communication unit 103 receives inputs of video signals transmitted from the video transmission apparatuses 12a and 12b and outputs the video signals to the control unit 101. As the communication unit 103, a device that employs a scheme such as the High-Definition Multimedia Interface (HDMI) (registered trademark), a wired local area network (LAN), or a wireless LAN is used. In the present example embodiment, video data transmitted from the video transmission apparatus 12a through the communication unit 103 is captured under control of the control unit 101 and is temporarily stored in the screen A storage area 121a of the storage unit 102 shown in FIG. 3. Moreover, video data transmitted from the video transmission apparatus 12b through the communication unit 103 is captured under control of the control unit 101 and is temporarily stored in the screen B storage area 121b of the storage unit 102 shown in FIG. 3.

The capturing unit 104 captures the screen of the video reception apparatus 11 itself displayed on the display unit 105. In the present example embodiment, video data captured by the capturing unit 104 is temporarily stored in the screen C storage area 121c of the storage unit 102 shown in FIG. 3 under control of the control unit 101.

The display unit 105 displays images based on video signals. A liquid crystal display or a projector is used as the display unit 105. In the present example embodiment, the screen of the main screen generation unit 106, which serves as a main screen, captured videos of the video transmission apparatuses 12a and 12b, and a captured video of the display screen of the video reception apparatus 11 itself can be synthesized, and the synthesized video can be displayed on the display unit 105.

The main screen generation unit 106 generates videos of the main screen that are to be projected on the video reception apparatus 11 itself. When the video reception apparatus 11 is a personal computer, the main screen generation unit 106 may generate an operation screen of a computer. The display output unit 107 outputs video signals displayed by the video reception apparatus 11 to the outside.

As described before, the screen from the main screen generation unit 106, which serves as a main screen, captured videos of the video transmission apparatuses 12a and 12b, and a captured video of the display screen of the video reception apparatus 11 itself captured by the capturing unit 104 can be synthesized, and the synthesized video can be displayed on the display unit 105. However, when a video of the video reception apparatus 11 itself is captured and displayed, if a display screen of the video reception apparatus 11 itself that has been previously captured is captured, a loop of displayed videos arises and a nested state like an infinity mirror occurs. Thus, in the present example embodiment, when a display screen of the video reception apparatus 11 itself that has been previously captured is included in the display area of the captured video, the range of the display screen of the video reception apparatus 11 itself that has been previously captured is removed from an area to be captured. This operation will be described below.

Figure 4A:
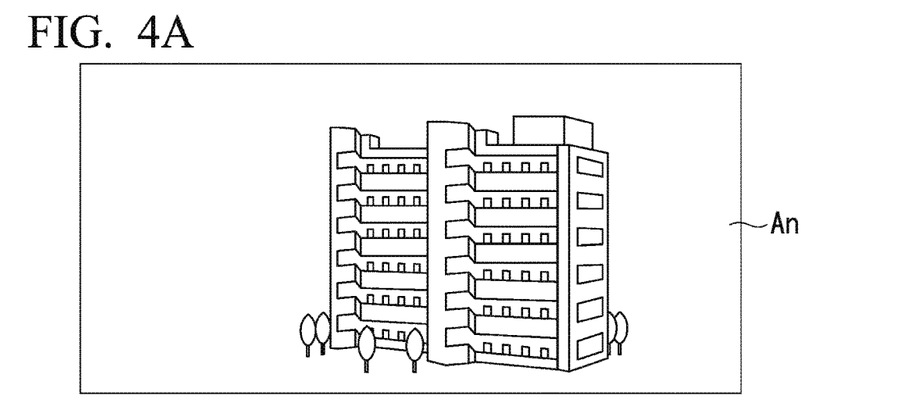
FIG. 4A is a diagram describing a screen captured by the video reception apparatus in accordance with the first example embodiment of the present invention.
Figure 4B:
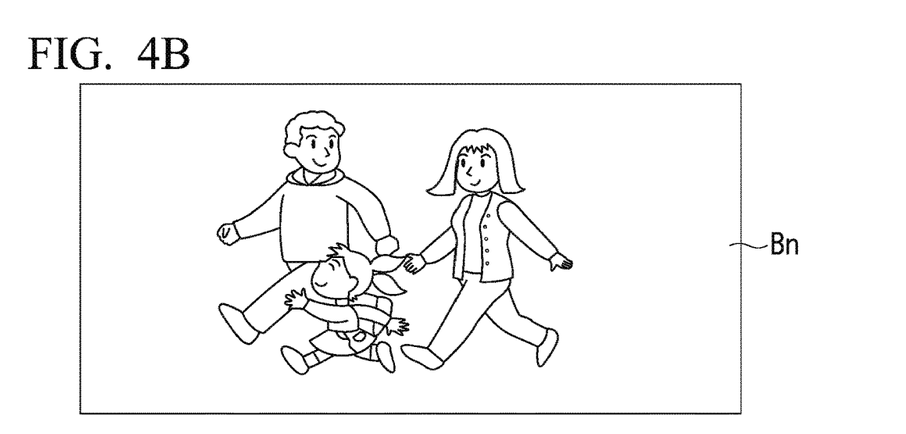
FIG. 4B is a diagram describing a screen captured by the video reception apparatus in accordance with the first example embodiment of the present invention.
Figure 4C:
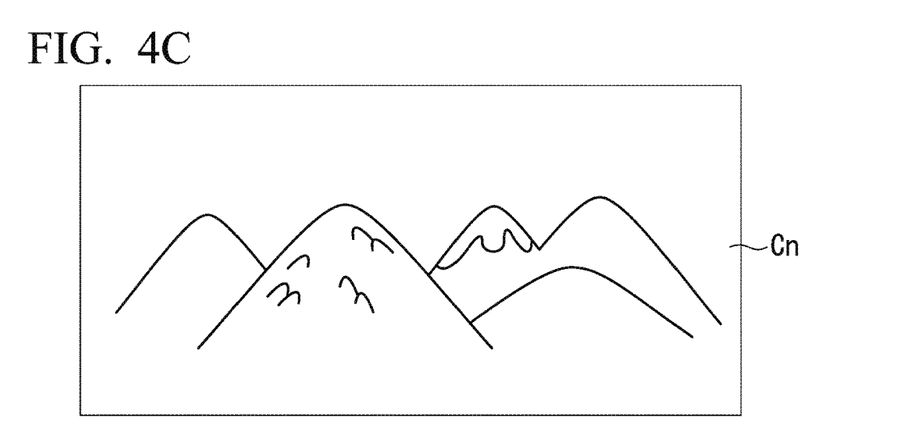
FIG. 4C is a diagram describing a screen captured by the video reception apparatus in accordance with the first example embodiment of the present invention.

FIG. 4A, FIG. 4B, and FIG. 4C are diagrams describing screens captured by the video reception apparatus 11 in accordance with first example embodiment of the present invention.

Videos of screens An, An+1, An+2, (n is an arbitrary integer) of the $n^{th}$ frame, the $n+1^{th}$ frame, the $n+2^{th}$ frame, . . . are transmitted from the video transmission apparatus 12a to the video reception apparatus 11. The video data of the screens An, An+1, An+2, . . . from the video transmission apparatus 12a is temporarily stored in the screen A storage area 121a of the storage unit 102. FIG. 4A shows the screen An of the video transmission apparatus 12a in the case of the $n^{th}$ frame.

Moreover, videos of screens Bn, Bn+1, Bn+2, . . . of the $n^{th}$ frame, the $n+1^{th}$ frame, the $n+2^{th}$ frame, . . . are transmitted from the video transmission apparatus 12b to the video reception apparatus 11. The video data of the screens Bn, Bn+1, Bn+2, from the video transmission apparatus 12b is temporarily stored in the screen B storage area 121b of the storage unit 102. FIG. 4B shows the screen Bn of the video transmission apparatus 12b in the case of the $n^{th}$ frame.

Moreover, screens Cn, Cn+1, Cn+2, . . . of the $n^{th}$ frame, the $n+1^{th}$ frame, the $n+2^{th}$ frame, . . . displayed by the video reception apparatus 11 itself are captured by the capturing unit 104. The video data of the screens Cn, Cn+1, Cn+2, . . . captured by the capturing unit 104 is temporarily stored in the screen C storage area of the storage unit 102. FIG. 4C shows the captured screen Cn of the video reception apparatus 11 itself in the case of the $n^{th}$ frame. This example assumes that with respect to the frames before the $n^{th}$ frame, no synthesizing processes of screens are performed and only videos from the main screen generation unit 106 are projected on the display unit 105.

Moreover, it is assumed that with respect to the $n+1^{th}$ frame and the subsequent frames, the screen of the main screen generation unit 106, which serves as a main screen, captured videos of the video transmission apparatuses 12a and 12b, and a captured video of the display screen of the video reception apparatus 11 itself are synthesized and the synthesized video is displayed.

As shown in FIG. 4A, the screen An of the video transmission apparatus 12a in the case of the $n^{th}$ frame is stored in the screen A storage area 121a of the storage unit 102. As shown in FIG. 4B, the screen Bn of the video transmission apparatus 12b in the case of $n^{th}$ frame is stored in the screen B storage area 121b of the storage unit 102. Moreover, as shown in FIG. 4C, the screen Cn of the video reception apparatus 11 itself in the case of the $n^{th}$ frame is stored in the screen C storage area 121c of the storage unit 102.

Figure 5A:
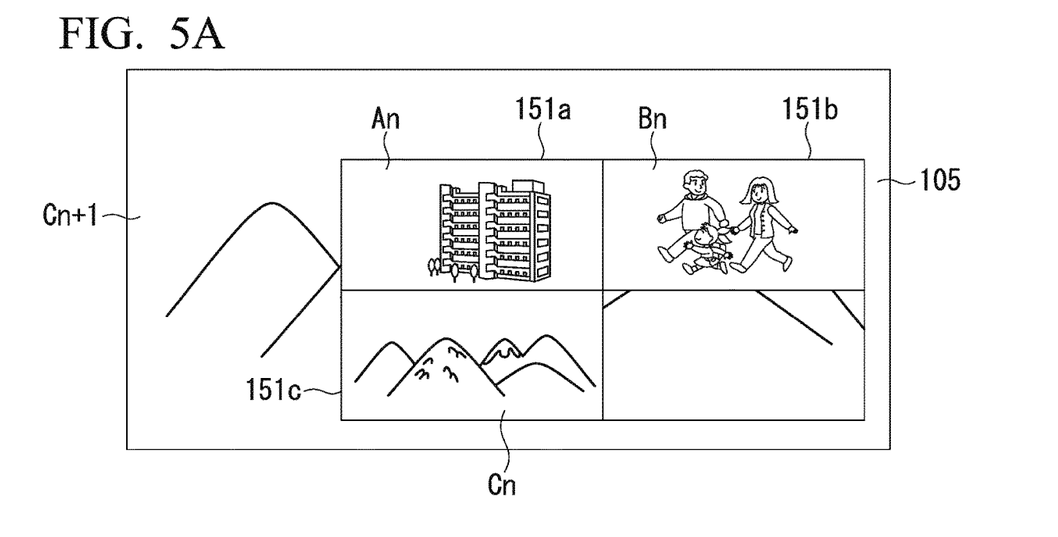
FIG. 5A is a diagram describing a display screen synthesized by the video reception apparatus in accordance with the first example embodiment of the present invention.
Figure 5B:
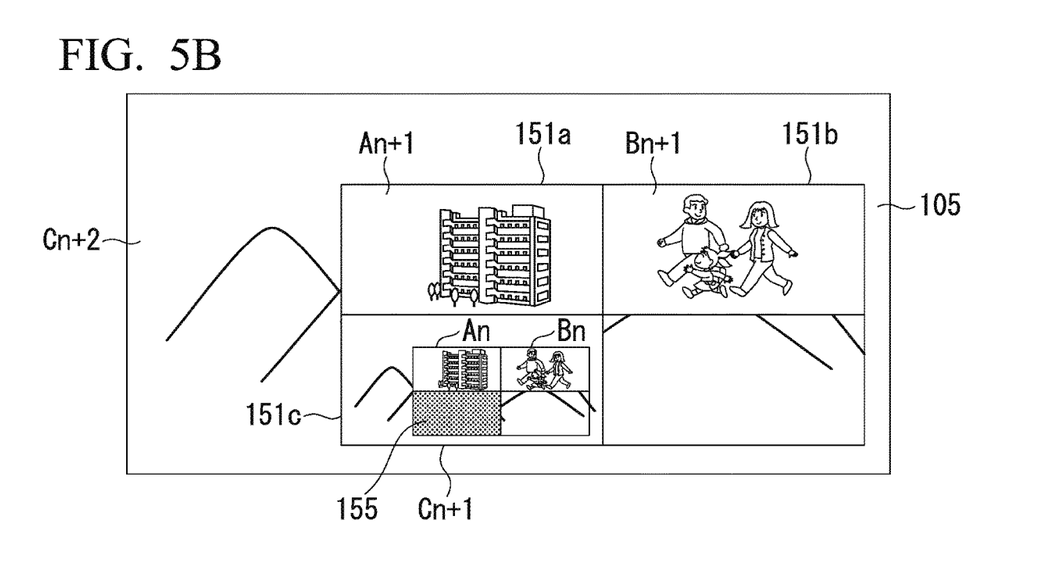
FIG. 5B is a diagram describing a display screen synthesized by the video reception apparatus in accordance with the first example embodiment of the present invention.

FIG. 5A and FIG. 5B are diagrams describing display screens synthesized by the video reception apparatus in accordance with the first example embodiment of the present invention.

FIG. 5A shows a display screen (the screen Cn+1) of the display unit 105 of the $n+1^{th}$ frame. As shown in FIG. 5A, the screen of the main screen generation unit 106 of the $n+1^{th}$ frame is displayed on the main screen. Then, the screen An (see FIG. 4A) is read out from the screen A storage area 121a of the storage unit 102 and is displayed in a display area 151a as a captured video of the video transmission apparatus 12a. Moreover, the screen Bn (see FIG. 4B) is read out from the screen B storage area 121b of the storage unit 102 and is displayed in a display area 151b as a captured video of the video transmission apparatus 12b. Furthermore, the screen Cn (see FIG. 4C) of the video reception apparatus 11 itself is read out from the screen C storage area 121c of the storage unit 102 and is displayed in a display area 151c as a captured video of the display screen of the video reception apparatus 11 itself. In this manner, in the display screen (the screen Cn+1) of the display unit 105 of the $n+1^{th}$ frame, the screen of the main screen generation unit 106 of the $n+1^{th}$ frame is used as a main screen, and the main screen, the captured video (the screen An) of the video transmission apparatus 12a of the $n^{th}$ frame, the captured video (the screen Bn) of the video transmission apparatus 12b of the $n^{th}$ frame, and the captured video (the screen Cn) of the display screen of the video reception apparatus 11 itself of the $n^{th}$ frame are synthesized.

Moreover, while the above process is performed, the screen An+1 of the $n+1^{th}$ frame is stored in the screen B storage area 121a of the storage unit 102. Moreover, the screen Bn+1 of the $n+1^{th}$ frame is stored in the screen B storage area 121b of the storage unit 102. Moreover, the display screen (the screen Cn+1) of the video reception apparatus 11 itself at this time is stored in the screen C storage area 121c of the storage unit 102 as a captured video.

Here, in the present example embodiment, when the display screen (the screen Cn+1) is captured, if a predetermined area is included in the display area of the captured image, the control unit 101 generates a second video in which a first allocation area that is allocated to a first capturing target includes a captured video in which a predetermined process is performed on the predetermined area. Here, for example, an area allocated as a target area that displays a capturing target when the capturing unit 104 previously performed the capturing can be used as the predetermined area. Moreover, when the capturing unit 104 acquires a second captured video using the second video as a second capturing target, if a predetermined area is included in the second captured video, the control unit 101 generates a third video in which a second allocation area that is allocated to the second capturing target includes the second captured video in which a predetermined process is performed on the predetermined area. For example, part of the first allocation area can be used as the predetermined area included in the second captured video in this case.

Moreover, for example, the control unit 101 determines whether or not the display screen (the screen Cn) of the video reception apparatus 11 itself that has been previously captured is included, and if the display screen (the screen Cn) of the video reception apparatus 11 itself that has been previously captured is included, the control unit 101 obtains the position and size thereof and excludes the range thereof from an area to be captured in the display screen of the video reception apparatus 11 itself.

Figure 6:
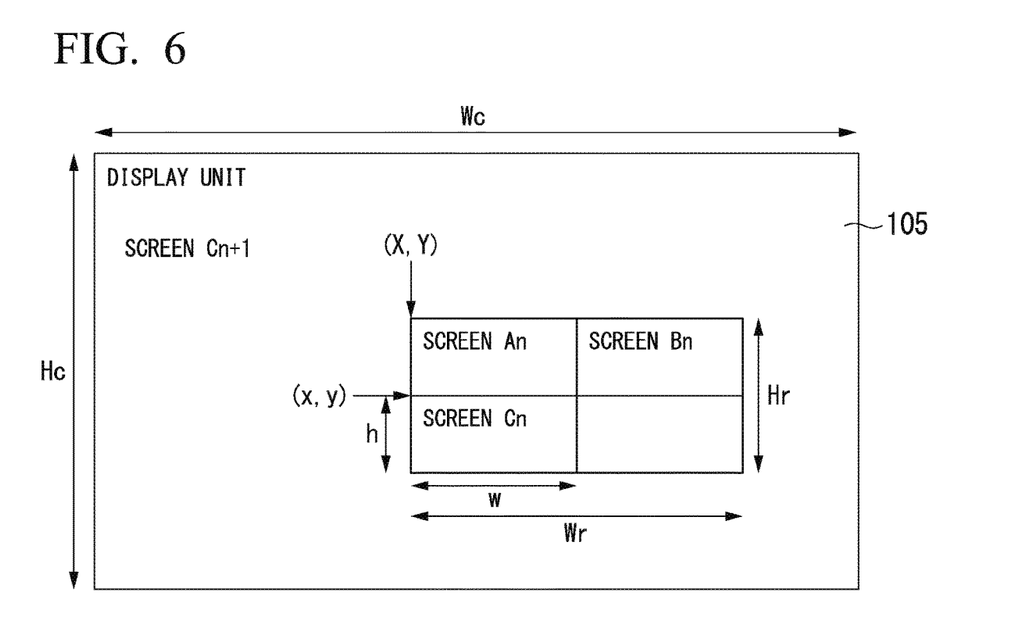
FIG. 6 is a diagram describing a process of obtaining the positions and sizes of screens in the video reception apparatus in accordance with the first example embodiment of the present invention

FIG. 6 is a diagram describing a process of obtaining the positions and sizes of screens in the video reception apparatus in accordance with the first example embodiment of the present invention. Referring to FIG. 6, the upper left corner of the display unit 105 is set as an origin (0, 0), and the display unit 105 has a size of (W, H). A captured image is displayed in a display area having a position of (X, Y) and a size of (Wr, Hr). Moreover, when the position of (X, Y) is used as an origin (0, 0), an area that includes the display screen (the screen Cn) of the video reception apparatus 11 itself that has been previously captured and that is present within the display of the captured image has a size of (w, h) and is displayed at a capturing position of (x, y). Thus, the range excluded from the capturing has a position of (X+x, Y+y) on the display unit and a size of (w, h).

FIG. 5B shows the display screen (the screen Cn+2) of the display unit 105 of the n+2$^{th}$ frame. As shown in FIG. 5B, the screen of the main screen generation unit 106 of the n+2$^{th}$ frame is displayed on the main screen. Then, the screen An+1 is read out from the screen A storage area 121a of the storage unit 102 and is displayed in the display area 151a as a captured video of the video transmission apparatus 12a. Moreover, the screen Bn+1 is read out from the screen B storage area 121b of the storage unit 102 and is displayed in the display area 151b as a captured video of the video transmission apparatus 12b. Moreover, the screen Cn+1 of the video reception apparatus 11 itself is read out from the screen C storage area 121c of the storage unit 102 and is displayed in the display area 151c as a captured video of the display screen of the video reception apparatus 11 itself. In this manner, in the display screen (the screen Cn+2) of the display unit 105 of the n+2$^{th}$ frame, the screen of the main screen generation unit 106 of the n+2$^{th}$ frame is a main screen, and the main screen, the captured video (the screen An+1) of the video transmission apparatus 12a of the n+1$^{th}$ frame, the captured video (the screen Bn+1) of the video transmission apparatus 12b of the n+1$^{th}$ frame, and the captured video (the screen Cn+1) of the display screen of the video reception apparatus 11 itself of the n+1$^{th}$ frame are synthesized.

Here, the captured video of the display screen of the video reception apparatus 11 itself displayed in the display area 151c in FIG. 5B is the screen of the screen Cn+1 shown in FIG. 5A, in which the screen of the display area 151c, which displays the display screen (the screen Cn) of the video reception apparatus 11 itself that has been previously captured, is excluded from an area to be captured. Here, the control unit 101 synthesizes the area corresponding to the portion excluded from the area to be captured and a specified image (a reference sign 155). Although any image can be used as the specified image, for example, an image filled with a single color can be used. As a result, the specified image is displayed in the area within the display area 151c of FIG. 5B (the area under the area shown as the screen An) in which the display screen of the video reception apparatus 11 itself that has been previously captured should be displayed.

Thus, the video of the display screen (the screen Cn) of the video reception apparatus 11 itself that has been previously captured is not included in the captured video of the display area 151c in FIG. 5B. For this reason, it is possible to prevent a loop of videos arising and a nested state like an infinity mirror occurring. In this manner, in the present example embodiment, the screen of the video reception apparatus 11 itself except for the portion of the video of the display screen Cn of the video reception apparatus 11 itself that has been previously captured within the display screen of the video reception apparatus 11 itself is captured, and thus it is possible to prevent a loop of videos arising and a nested state like an infinity mirror occurring.

Here, although an image filled with a single color can be used as the specified image, instead of using such an image, for example, an image of part of the area of the image Cn+1 of the previous frame that has been previously stored may be synthesized. As the image of the part of the area of the image Cn+1 of the previous frame, for example, the image in the image Cn+1 that has the same coordinates as the area in which the specified image is displayed can be used. In this case, as shown in an area 156 of FIG. 5C, an image that is similar to the image displayed in the display area 151c in the image Cn+2 is displayed. For this reason, the image of the display area 151c and the image of the area 156 are displayed as if these images form one continuous image.

Figure 5C:
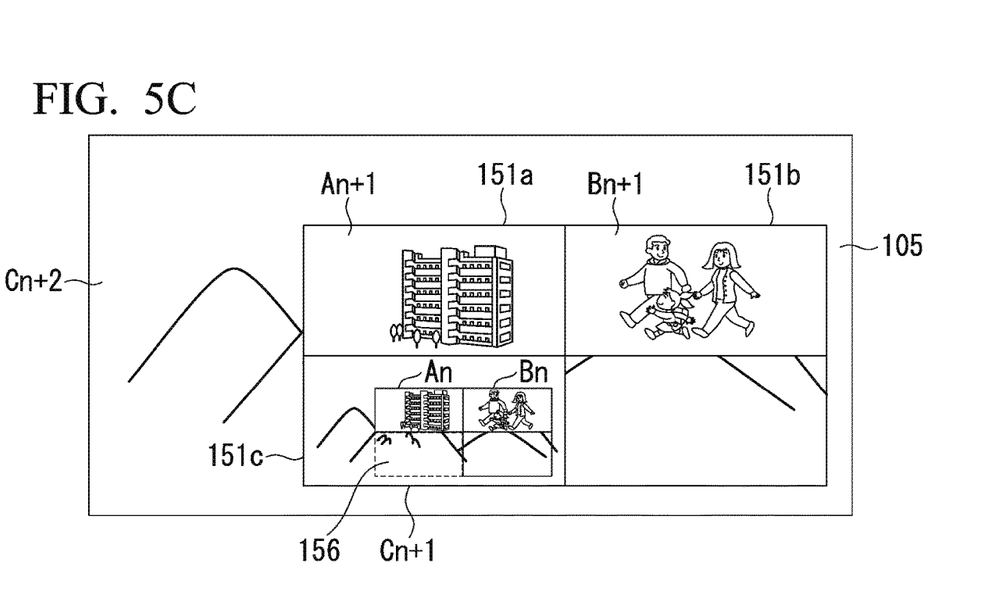
FIG. 5C is a diagram describing a display screen synthesized by the video reception apparatus in accordance with the first example embodiment of the present invention.
Figure 5D:
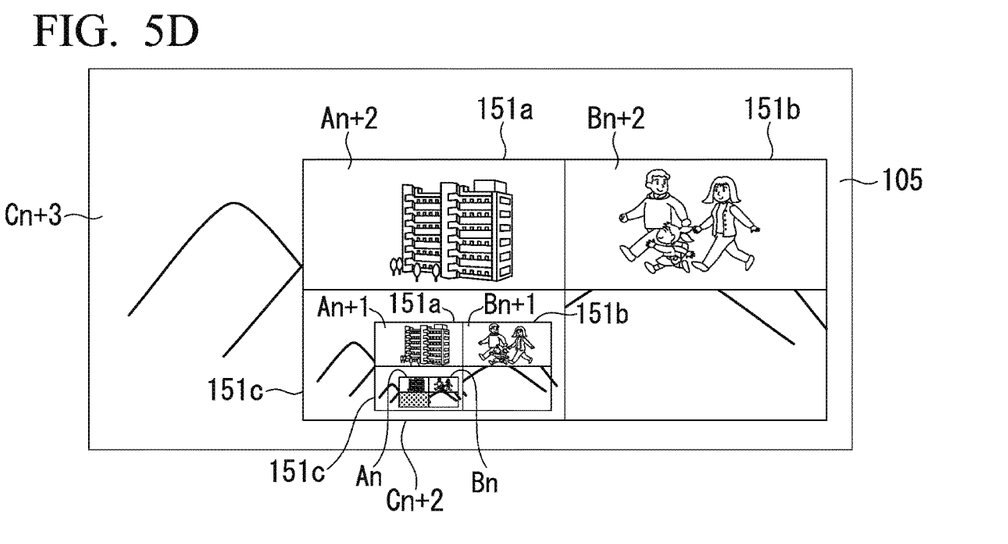
FIG. 5D is a diagram describing a display screen synthesized by the video reception apparatus in accordance with the first example embodiment of the present invention.
Figure 5E:
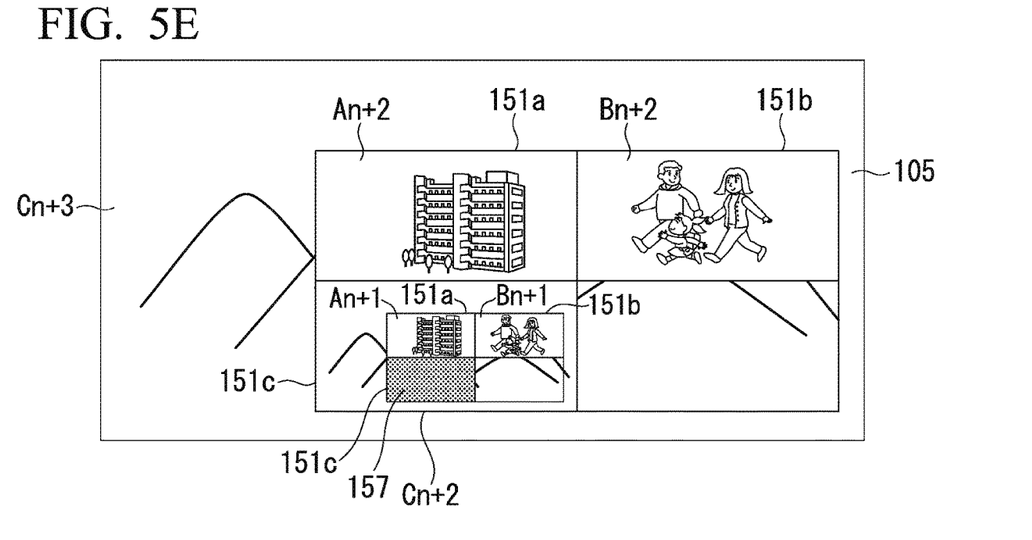
FIG. 5E is a diagram describing a display screen synthesized by the video reception apparatus in accordance with the first example embodiment of the present invention.

After the screen shown in FIG. 5C is displayed, an image obtained by capturing the screen is further displayed in the next frame. Here, when a previously captured image is included in the captured image, the control unit 101 generates a synthesized video so that a captured video in which a predetermined process is performed on the area that should display the previously captured image is included in an allocation area allocated to this capturing target. Here, if a captured image itself is used and is displayed on the display screen, the image as shown in FIG. 5D is displayed after the image of FIG. 5C is displayed. That is, although part of the image in the third previous frame is not displayed because a specified image is displayed, nested images may be generated with respect to the area in which the image corresponding to the second previous frame is displayed. Thus, the control unit 101 excludes the screen of the display area 151c in which the display screen (the screen Cn+2) of the video reception apparatus 11 itself that has been previously captured should be displayed from an area to be captured and then captures the remaining areas. Then, the control unit 101 synthesizes a specified image (a reference sign 157) and the area corresponding to the portion excluded from the area to be captured, as shown in FIG. 5E. As a result, even if the target area in which the third previous frame should be displayed is included in part of the screen that is to be captured this time, the specified image is displayed in the area (the area under the area shown as the screen An) in the allocation area display area 151c in which the display screen of the video reception apparatus 11 itself that has been previously captured should be displayed.

Figure 7:
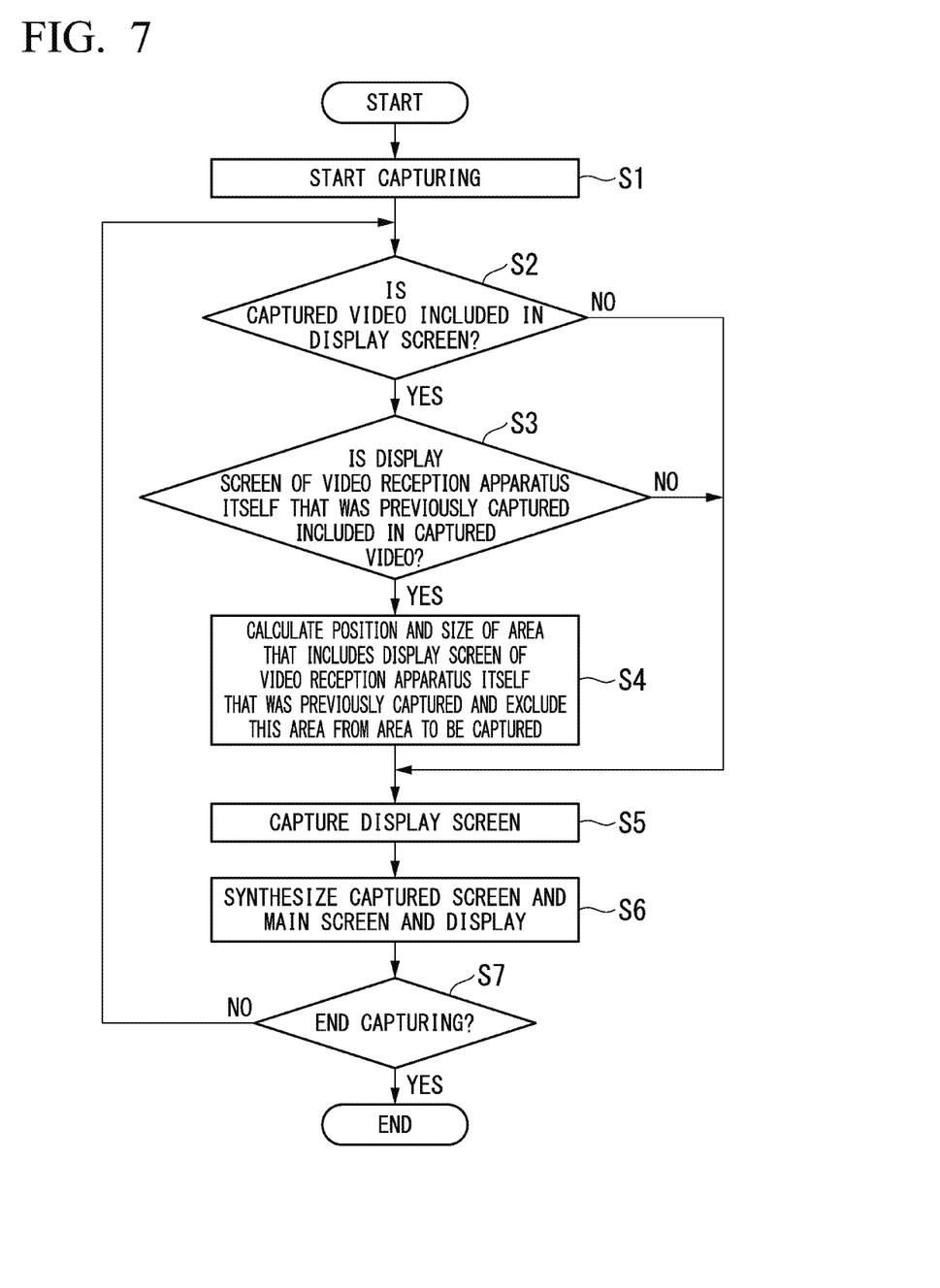
FIG. 7 is a flowchart showing the processing in the video reception apparatus in accordance with the first example embodiment of the present invention.

FIG. 7 is a flowchart showing the processing in the video reception apparatus 11 in accordance with the first example embodiment of the present invention.

(Step S1)

The control unit 101 starts a process of synthesizing a screen that serves as a main screen and a captured video of a display screen of the video reception apparatus 11 itself.

(Step S2)

The control unit 101 determines whether or not a captured video is included in the display screen. If the captured video is included in the display screen (step S2: Yes), the control unit 101 advances the processing to step S3. If the captured video is not included in the display screen (step S2: No), the control unit 101 advances the processing to step S5.

(Step S3)

The control unit 101 determines whether or not a video of the display screen of the video reception apparatus 11 itself that has been previously captured is included in the captured video. If a video of the display screen of the video reception apparatus 11 itself that has been previously captured is included in the captured video (step S3: Yes), the control unit 101 advances the processing to step S4. If a video of the display screen of the video reception apparatus 11 itself that has been previously captured is not included in the captured image (step S3: No), the control unit 101 advances the processing to step S5.

(Step S4)

The control unit 101 obtains the position and size of the area that includes the video of the display screen of the video reception apparatus 11 itself that has been previously captured and excludes the area that includes the video of the display screen of the video reception apparatus 11 itself that has been previously captured from the area of the screen of the video reception apparatus 11 itself to be captured.

(Step S5)

The control unit 101 captures the video of the display screen except for the area that includes the video of the display screen of the video reception apparatus 11 itself that has been previously captured and stores the captured video in the storage unit 102.

(Step S6)

The control unit 101 reads out the captured video from the storage unit 102, synthesizes the captured video and the main screen, and causes the display unit 105 to display the synthesized result.

(Step S7)

The control unit 101 determines whether or not capturing should be ended, and if the capturing should not be ended (step S7: No), the control unit 101 returns the processing to step S2. If the capturing should be ended (step S7: Yes), the control unit 101 ends the processing.

As described above, in the present example embodiment, if a video of the display screen of the video reception apparatus 11 itself that has been previously captured is included in the display area of the captured video, the area of the video of the display screen of the video reception apparatus 11 itself that has been previously captured is excluded from an area to be captured. As a result, it is possible to prevent a loop of videos arising and a nested state like an infinity mirror occurring.

It is to be noted that although the area of the video of the display screen of the video reception apparatus 11 itself that has been previously captured within the display area of the captured video is excluded from the area to be captured in the above-described first example embodiment, a captured video of another apparatus may also be excluded from the area to be captured. That is, when the display screen (the screen Cn+1) is captured as shown in FIG. 5A, not only the area that includes the display screen (the screen Cn) of the video reception apparatus 11 itself that has been previously captured but also the area of the screen (the screen An) of the video transmission apparatus 12*a* and/or the area of the screen (the screen Bn) of the video transmission apparatus 12*b* may be excluded from the area to be captured.

Moreover, although the area of the video of the display screen of the video reception apparatus 11 itself that has been previously captured within the display area of the captured video is excluded from the area to be captured in the above-described first example embodiment, the area of the video of the display screen of the video reception apparatus 11 itself that has been previously captured may be filled with a specified color. Moreover, the area of the video of the display screen of the video reception apparatus 11 itself that has been previously captured and a specified image may be synthesized. In brief, if a video of the display screen of the video reception apparatus 11 itself that has been previously captured is included in the display area of the captured video, the area of the video of the display screen of the video reception apparatus 11 itself that has been previously captured is not displayed, thereby it is possible to prevent a loop of videos arising and a nested state like an infinity mirror occurring.

Figure 8:
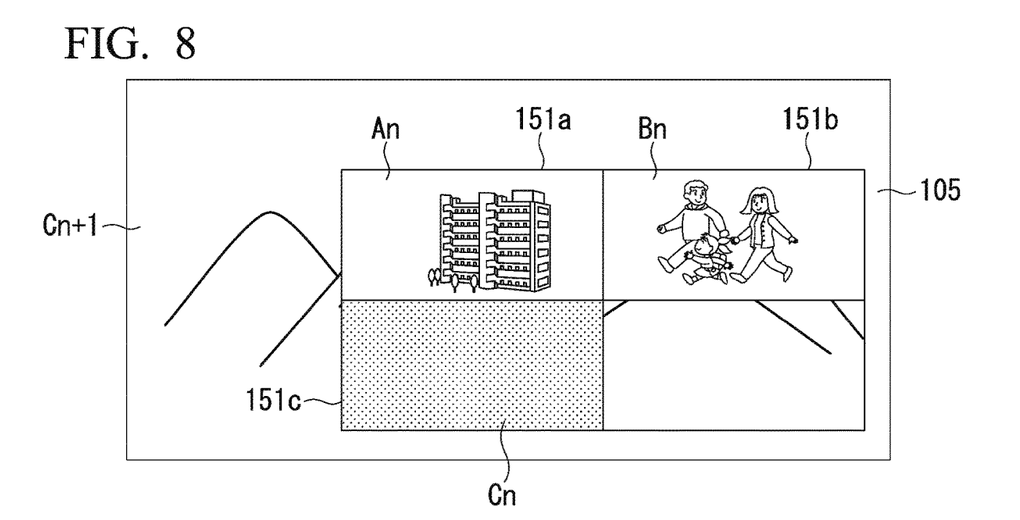
FIG. 8 is a diagram describing a display screen synthesized by a video reception apparatus in accordance with another example embodiment of the present invention.

FIG. 8 is a diagram describing a display screen synthesized by a video reception apparatus in accordance with another example embodiment of the present invention. In this example, a captured video is the screen Cn+1, in which the screen of the display area 151*c* that displays the display screen (the screen Cn) of the video reception apparatus 11 itself that has been previously captured is filled with a desired color.

Figure 9:
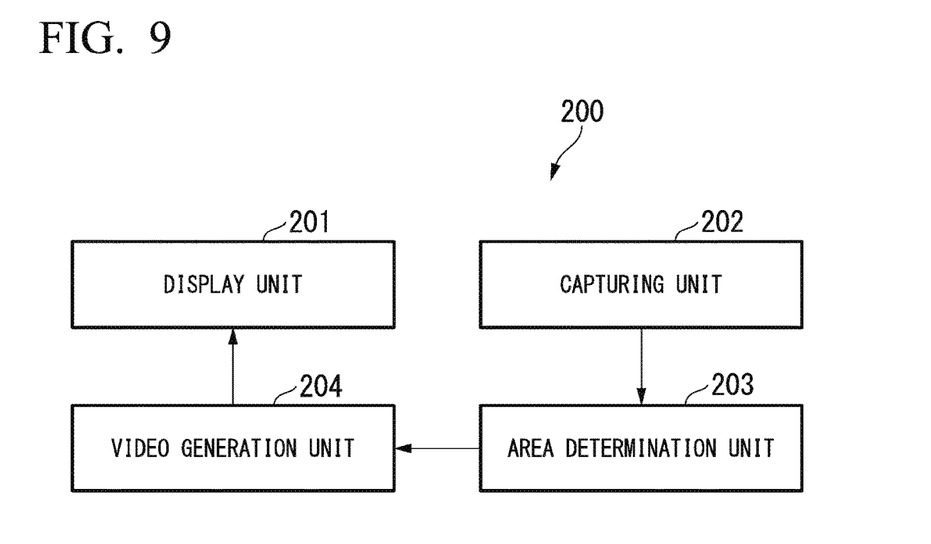
FIG. 9 is a schematic block diagram showing a basic structure of a video control apparatus in accordance with the present invention.

FIG. 9 is a schematic block diagram showing a basic structure of a video control apparatus in accordance with the present invention. That is, as a basic structure, a video control apparatus 200 in accordance with the present invention is provided with a display unit 201, a capturing unit 202, an area determination unit 203, and a video generation unit 204

The display unit 201 displays videos. The capturing unit 202 captures videos of the display screen of the display unit 201. The area determination unit 203 determines whether or not a second area that displays a video of the display screen that has been previously captured is included in a first area that is an area of a capturing target of a video. If the second area is included in the first area, the video generation unit 204 generates a video in which the video of the second area is not displayed from a video that has been captured from the first area and displays the generated video on the display unit 201.

The entirety or part of the video display system 1 in the above-described example embodiment may be implemented by a computer. In this case, the entirety or part of the video display system 1 may be implemented by recording a program that implements the functions thereof on a computer-readable recording medium and causing a computer system to read the program recorded on this recording medium and execute the program. It is to be noted that it is assumed that "computer system" mentioned here includes an OS and hardware such as peripheral devices. Moreover, "computer-readable recording medium" refers to a portable medium, such as a flexible disk, a magneto-optical disc, ROM, or CD-ROM, and a storage apparatus such as a hard disk built in a computer system. Furthermore, "computer-readable recording medium" may also include a medium that dynamically holds the program for a short period of time, like a communication line when a program is transmitted through a network, such as the Internet, or a communication line, such as a telephone line, and a medium that holds a program for a given period of time such as a volatile memory inside a computer system that functions as a server or a client in that case. Additionally, the program may implement some of the above-described functions, it may implement the above-described functions in combination with a program already recorded in a computer system, and it may be implemented using programmable logic devices, such as FPGAs.

Although example embodiments of the present invention have been described above in detail with reference to the drawings, the specific structure thereof is not limited to the example embodiments, and designs and so forth that do not depart from the gist of the present invention are also included.

DESCRIPTION OF REFERENCE SIGNS 11 video reception apparatus
12a, 12b video transmission apparatus
201 display unit
202 capturing unit
203 area determination unit
204 video generation unit

The invention claimed is:

1. A video control apparatus comprising:
a display that displays a video;
a capturer that captures a video of a display screen of the display;
an area determiner that determines whether or not a second area that displays a video of a display screen that has been previously captured is included in a first area that is an area of a capturing target of the video; and
a video generator that generates a video in which the video of the second area is not displayed from a video that has been captured from the first area and displays the generated video on the display if the second area is included in the first area.

2. The video control apparatus according to claim 1, wherein the video generator generates the video in which the video of the second area is not displayed by excluding the video of the second area within the first area from the capturing target and capturing the video.

3. The video control apparatus according to claim 1, wherein the video generator generates the video in which the video of the second area is not displayed by synthesizing the video of the second area within the first area and a video that is different from the video of the second area.

4. A video control apparatus comprising:
a display that displays a first video;
a capturer that acquires a first captured video using the first video as a first capturing target; and
a video generator that generates a second video in which a first allocation area that is allocated to the first capturing target includes the first captured video in which a predetermined process is performed on a predetermined area if the predetermined area is included in the first captured video,
wherein the display displays the second video after displaying the first video.

5. The video control apparatus according to claim 4, wherein the predetermined area is an area that is allocated to a previous capturing target of the capturer.

6. The video control apparatus according to claim 4, wherein the capturer further acquires a second captured video using the second video as a second capturing target,
the video generator generates a third video in which a second allocation area that is allocated to the second capturing target includes the second captured video in which the predetermined process is performed on the predetermined area if the predetermined area is included in the second captured video, and
the display displays the third video after displaying the second video.

7. The video control apparatus according to claim 6, wherein the predetermined area included in the second captured video is part of the first allocation area.

8. The video control apparatus according to claim 4, wherein the predetermined process includes at least a process of excluding a portion of the predetermined area from a video acquired by the capturer.

9. The video control apparatus according to claim 4, wherein the predetermined process includes at least a process of synthesizing a predetermined video and the predetermined area that is included in a video captured by the capturer.

10. A video control method comprising:
determining whether or not a second area that displays a video of a display screen that has been previously captured is included in a first area that is an area of a capturing target of a video when a video that is displayed on a display is captured; and
generating a video in which the video of the second area is not displayed from a video that has been captured from the first area and displaying the generated video on the display if the second area is included in the first area.

* * * * *